US008152558B2

(12) United States Patent
Broeksteeg et al.

(10) Patent No.: US 8,152,558 B2
(45) Date of Patent: Apr. 10, 2012

(54) SHIELDED USB CONNECTOR SYSTEM

(75) Inventors: Johannes Marcelus Broeksteeg, Oss (NL); Lieven Decrock, Roeselare (BE); Peter Dirk Jaeger, Dussen (NL)

(73) Assignee: Tyco Electronics Belgium EC NV, Oostkamp (BE)

( * ) Notice: Subject to any disclaimer, the term of this patent is extended or adjusted under 35 U.S.C. 154(b) by 153 days.

(21) Appl. No.: 12/734,633

(22) PCT Filed: Nov. 10, 2008

(86) PCT No.: PCT/EP2008/009466
§ 371 (c)(1),
(2), (4) Date: May 13, 2010

(87) PCT Pub. No.: WO2009/062648
PCT Pub. Date: May 22, 2009

(65) Prior Publication Data
US 2010/0233891 A1   Sep. 16, 2010

(30) Foreign Application Priority Data

Nov. 13, 2007   (EP) .................................... 07022046

(51) Int. Cl.
*H01R 13/64* (2006.01)
*H04M 1/00* (2006.01)

(52) U.S. Cl. ..... 439/378; 439/76.1; 439/623; 439/924.1; 439/929

(58) Field of Classification Search ................. 439/76.1, 439/378, 540.1, 623, 929; 455/575.9; 320/113, 320/115; 379/446

See application file for complete search history.

(56) References Cited

U.S. PATENT DOCUMENTS

| | | | | |
|---|---|---|---|---|
| 5,111,360 A | * | 5/1992 | Baba ............................. | 361/727 |
| 5,234,353 A | * | 8/1993 | Scholz et al. ................. | 439/289 |
| 5,356,300 A | * | 10/1994 | Costello et al. ............... | 439/101 |
| 5,392,350 A | * | 2/1995 | Swanson ....................... | 379/446 |
| 5,439,394 A | * | 8/1995 | Ikeda ............................ | 439/675 |
| 5,555,448 A | * | 9/1996 | Thiede et al. ................ | 455/74.1 |
| 5,718,592 A | * | 2/1998 | Hosler et al. .................... | 439/63 |
| 5,812,660 A | * | 9/1998 | Suzuki et al. ................. | 379/438 |
| 5,822,427 A | * | 10/1998 | Braitberg et al. ............. | 379/454 |
| 5,885,088 A | * | 3/1999 | Brennan et al. ............... | 439/680 |

(Continued)

FOREIGN PATENT DOCUMENTS
WO             99/63631       * 12/1999

*Primary Examiner* — Neil Abrams
(74) *Attorney, Agent, or Firm* — Faegre Baker Daniels LLP

(57) ABSTRACT

The present invention relates to a universal serial bus (USB) connector for use in a base unit in a car kit comprising at least two pairs of shielded connection lines. It further relates to a USB cable for providing a shielded connection between a mobile unit and a car kit adaptor. The USB connector for use in a base unit in a car-kit comprises two twin axial connectors (430) including two inner contacts separated by a dielectric and further adapted to be connected to respective complementary connectors and two pairs of shielded connection lines (104 and 104'). Each pair is connected to a twin axial connector (430). Further, a shielded USB bridge (100) connects the two pairs of connection lines (104 and 104') to four cable terminations (106) to form a USB line (108). The bridge (100) is mounted in the base unit (400') with the twin axial connectors (430) located in modified guide gins (441) that extend from the base unit.

24 Claims, 8 Drawing Sheets

U.S. PATENT DOCUMENTS

| | | | |
|---|---|---|---|
| 6,203,344 B1 * | 3/2001 | Ito | 439/218 |
| 6,210,216 B1 * | 4/2001 | Tso-Chin et al. | 439/545 |
| 6,341,218 B1 * | 1/2002 | Poplawsky et al. | 455/569.1 |
| 6,461,198 B1 * | 10/2002 | Chao | 439/668 |
| 6,554,640 B1 * | 4/2003 | Koike et al. | 439/500 |
| 6,616,487 B1 * | 9/2003 | Lai | 439/668 |
| 6,776,658 B2 * | 8/2004 | Tang | 439/607.58 |
| 6,795,038 B2 * | 9/2004 | Choi | 343/906 |
| 6,991,497 B1 * | 1/2006 | Lin | 439/668 |
| 7,019,219 B2 * | 3/2006 | Bracaleone | 174/117 FF |
| 7,068,783 B2 * | 6/2006 | Peiker | 379/446 |
| 7,747,009 B2 * | 6/2010 | Cullman | 379/446 |
| 7,914,310 B2 * | 3/2011 | Johansson et al. | 439/284 |

\* cited by examiner

SHIELDED USB CONNECTOR SYSTEM

The present invention relates to a universal serial bus (USB) connector for use in a base unit in a car kit comprising at least two pairs of shielded connection lines. The present invention further relates to a USB cable for providing a shielded connection between a mobile unit and a car kit adaptor.

Mobile units such as mobile telephones have become widely spread in the last years and their use in an automotive environment can be considered a very common activity. In order to make the use of mobile units in an automotive environment more comfortable and to increase safeness, car kits for connecting the mobile unit to the car have become common gadgets.

Most of the mobile telephone manufacturers have made available car kits for holding the mobile unit and connecting it to a cradle, which usually requires professional installation, for providing power supply and electrical connections to a microphone, speakers and an antenna. Alternatively, car manufacturers started to produce cars with an embedded cradle for holding the mobile unit adaptor and connecting the mobile unit to the on-board electrical system of the car. Common car kits in production today comprise a base unit connected to the car and a snap-in adaptor for holding the mobile unit.

The connection between the mobile unit and the on-board electrical system of the car providing power supply and the transfer of data is realized through the bottom interface connector of the mobile unit. The protocol used to transfer data and the speed of the data transfer depends on the specification of the bottom connector, which depends on the manufacturer of the mobile unit. Hence, the connector in the car kit adapter has to comply different standards.

Further, the connection between the car kit adapter, the standard bottom interface connectors provided in mobile units and the base unit mounted in the car are not fully shielded, a partial shield being sufficient to prevent electromagnetic interference in everyday use of the mobile unit.

However, minimizing electrical interference becomes important when the mobile unit is connected to the on-board system of a car.

Moreover, since the bottom interface connector is usually proprietary and is designed according to different standards depending on the manufacturer of the mobile unit, in many cases a car kit of the standard type can be only used with one single model of mobile unit or at most with a few closely related models.

This has the disadvantage that if a user wants to replace a mobile unit with another one or if different users having different mobile units use the same car, most likely the existing car kit will not adapt to the different mobile units. Thus, in order to use mobile units produced by different manufacturers, different adaptors compatible with the mobile unit need to be used or the existing car kit has to be changed.

Therefore, the problem underlying the present invention is to provide a fully shielded connector for connecting a mobile unit to a base unit of a car kit, which can be adapted to existing hardware envelopes, which is forwards and backwards intermateable with existing competition connectors and which comply with the USB 2.0 specification regarding data speed and shielding as well as automotive shielding requirements.

This object is solved by the subject matter of the independent claims. Advantageous embodiments of the present invention are the subject matter of the dependent claims.

The present invention is based on the idea of developing a USB connector for use in a base unit in a car kit, which comprises two twin axial connectors including two inner contacts separated by a dielectric and two pairs of shielded connection lines, each pair being connected to a twin axial connector. The two pairs of connection lines are further connected to four cable terminations through a shielded USB bridge in order to form a USB line.

In an advantageous embodiment of the present invention, the first pair of connection lines is a signal pair and the second pair of connection lines is a power pair. The two pairs of connection lines may further be drawn wire contacts.

The USB connector according to the invention thus splits up, by means of a USB bridge, the signal and power line of a standard USB cable and connects them to two twin axial connectors, thereby obtaining a connector with a versatile design, which can be adapted to a plurality of hardware solutions.

Moreover, the USB bridge may comprise a housing for placing two pairs of cable terminations connected to the two pairs of shielded connection lines and may be further covered by a closed shield. In a preferred embodiment, the housing is a one-piece housing integrally formed with a dielectric and it may be further covered by a deep drawn shield fabricated from metal.

Such a housing makes the USB connector more resistant and easily connectable to complementary connectors. Further the closed shield guarantees a complete shielding of the connection lines, thereby allowing the use of such a connector in an automotive embodiment where shielding from electromagnetic interference becomes important.

According to a preferred embodiment of the present invention, an end portion of the USB line can be connected to a shielded four position connector, which may be especially designed for USB connections in an automotive environment. In this way, the USB connector according to the invention can be connected to the on-board electric system of a car.

In an advantageous development, the USB connector according to the invention may be placed in a base unit adapted to be connected to a mobile unit, wherein the base unit further comprises a plug housing with a plurality of contacts for electrically contacting complementary contacts of the mobile unit, a coaxial connector and a printed circuit board for mounting the plug housing and the coaxial connector and for connecting the contacts to an on-board electrical system of a car.

According to this embodiment, with minor changes to the hardware, a base unit of a standard car kit can be equipped with a USB connection and connected to the on-board system of the car. Furthermore, since the USB line is formed by connecting the two pairs of connection lines to four cable termination through a shielded USB bridge, the connection remains fully shielded.

According to another advantageous embodiment of the invention, the plug housing is fixed to the base unit through plug hold-downs and the base unit may comprise two projections having an opening on the top side, wherein each projection is adapted to receive the pair of connection lines, which can then be plugged in appropriate guiding slots in the mobile unit. Alternatively, the two projections may be integrated in the plug housing.

Thus, the splitting up of the USB line in a first connection line and a second connection line allows to place them into the guiding pins of the plug housing of an existing car kit base unit. Further, since the projections are not necessarily integrated in the plug housing, base units of existing car kits may be easily upgraded to a USB base unit.

The projections can be designed in a plurality of different ways according to the design of the car kit. In particular, an advantageous shape is a cylindrical shape, which allows an easy insertion in the guiding slots of the mobile unit.

An advantageous arrangement incorporating the principles of the present invention comprises a housing for mounting the plug housing, the coaxial connector, the connection lines, the USB bridge and the printed circuit board. The housing may be embedded in a car or may have a USB plug so as to be connectable to different car having a USB connector.

The present invention further relates to a USB cable for providing a shielded connection between a mobile unit and the shielded USB connectors in the base unit. The double shielded USB cable comprises two shielded twin axial cables, which include an impedance controlled differential pair connected to two twin axial connectors, respectively. The two twin axial connectors comprise two inner contacts separated by a dielectric and are adapted to be connected to respective complementary connectors. The two twin axial cables are further partially enveloped in another shield to form a double shielded USB cable.

The two twin axial cables in the double shielded USB cable according to the invention may be a signal pair and a power pair, respectively.

The splitting up of the two USB lines into two shielded twin axial cables allows to connect a USB line to a USB connector which, for design reasons, has to be split in a power connector and a signal connector. Further, since the two twin axial cables are shielded by an additional envelope, the connection is fully shielded. Thus the USB cable according to the invention can be used for establishing a connection in an automotive environment where shielding from electromagnetic interference is required.

Further, an end portion of the USB cable may be connected to a mini USB plug for establishing a connection with a mobile unit. This allows to connect a mobile unit, such as a mobile telephone provided with a USB connection, to a base unit provided with the USB connection according to the invention.

In a preferred embodiment, the USB cable according to the invention can be placed in an adaptor for connecting a mobile unit to a car kit base unit. The adaptor may further comprise a receptacle housing including receptacle contacts for electrically contacting complementary contacts of the base unit, a coaxial connector, receptacle slots for guiding the plug base unit during insertion and a printed circuit board for mounting the receptacle housing, the coaxial connector and the receptacle slots.

Since the USB cable comprises two shielded twin axial cables, the outer envelope of the cable assembly can be partially stripped and the twin axial connectors connected to the two connection lines of the USB cable can be placed in the two projections of the guiding slot.

The receptacle slots in the adaptor may have two projections, which in an advantageous embodiment, have a cylindrical form, thereby allowing an easy insertion of the twin axial connectors and at the same time serving as guiding slots for inserting guiding pins of a base unit.

Further, the twin axial connectors may have a L-shaped design for facilitating their insertion in the projections of the receptacle slot.

The receptacle housing in the adaptor can be fixed to the receptacle by using different techniques, an easy way of securing the receptacle housing is using receptacle hold-downs.

Further, in a useful embodiment of the present invention the receptacle housing, the coaxial connector, the receptacle guide slots, the USB cable and the printed circuit board are embedded into a housing. Alternatively, the adaptor may be integrated in the mobile unit.

An advantageous embodiment of a USB connector system for an automotive environment according to the present invention comprises a base unit including the shielded USB connector and adaptor including the USB cable, wherein the plug housing projections in the base unit can be plugged into the projection of the receptacle slots in the adaptor, so as to connect the connection lines included in the plug housing with the twin axial connectors in the receptacle slots.

By means of the above-mentioned USB connector system a car can be provided with a USB connection complying with the USB 2.0 high speed standards with regard to data transfer and shielding.

The accompanying drawings are incorporated into and form a part of the specification for the purpose of explaining the principle of the invention. The drawings are not to be construed as limiting the invention to only the illustrated and described examples of how the invention can be made and used. Further, features and advantages will become apparent from the following and more particular description of the invention as illustrated in the accompanying drawings, wherein.

Figure 1:
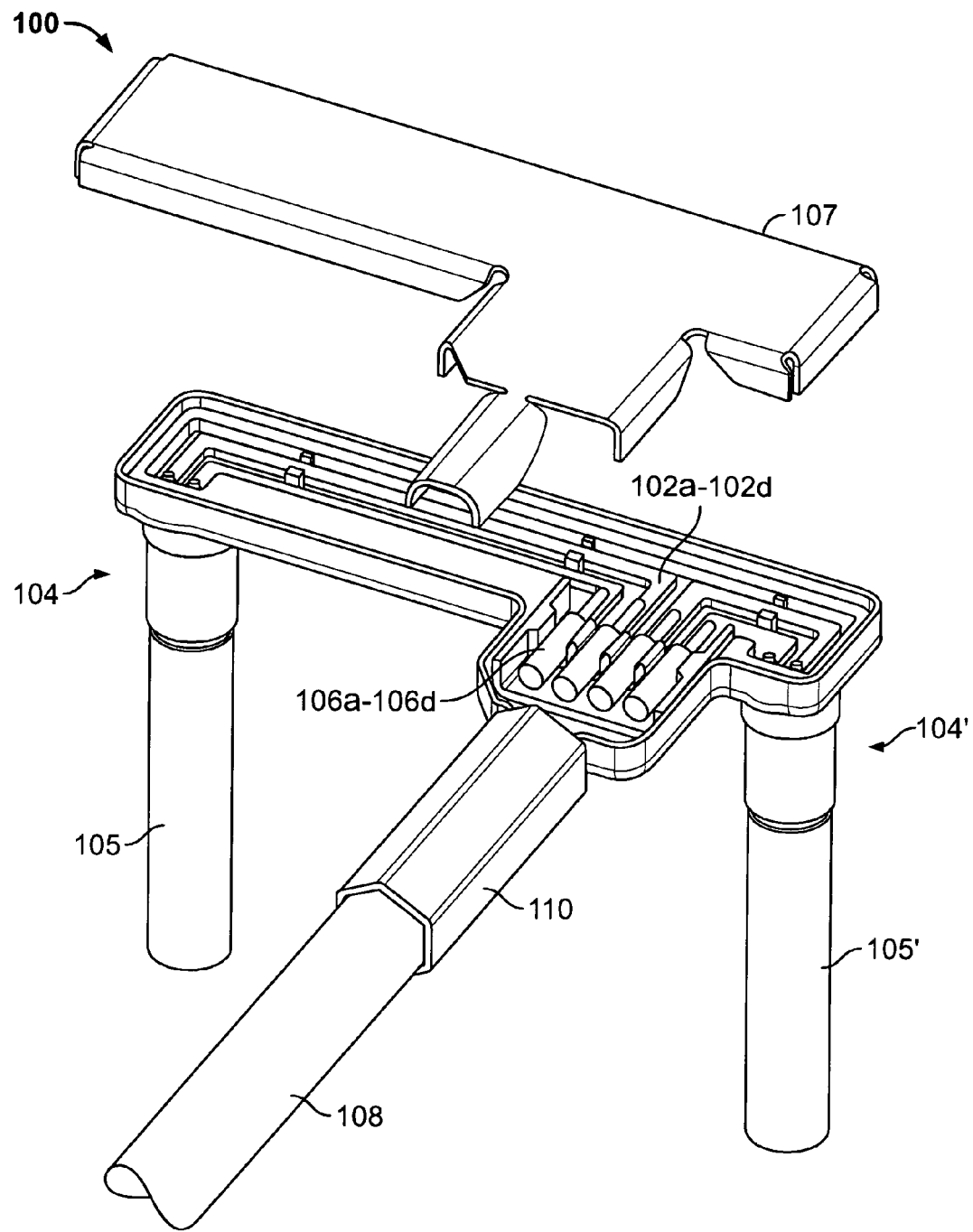
FIG. 1 shows a perspective view of a fully shielded USB bridge.

FIG. 1 shows a perspective view of the shielded USB bridge 100. The shielded USB bridge 100 comprises four contacts 102a to 102d, pair-wise connected, by means of four solder joints, to a pair of shielded power lines 104 and a pair of shielded signal lines 104' placed into two cylindrical housings 105 and 105'.

The four contacts 102a to 102d are further connected, through a solder-joint, to an end portion of four cables 106a to 106d forming a pair of USB signal lines and a pair of USB power lines. The four contacts 102a to 102d are shielded by the cover 107 and, outside the shielded USB bridge 100, the four cables 106a to 106d are enveloped in an outer shield to form a shielded USB cable 108. The shielding of the four cables 106a to 106d at the joint between the USB cable 108 and the USB bridge 100 is ensured by a shield portion 110 crimped with a ferrule.

Figure 2:
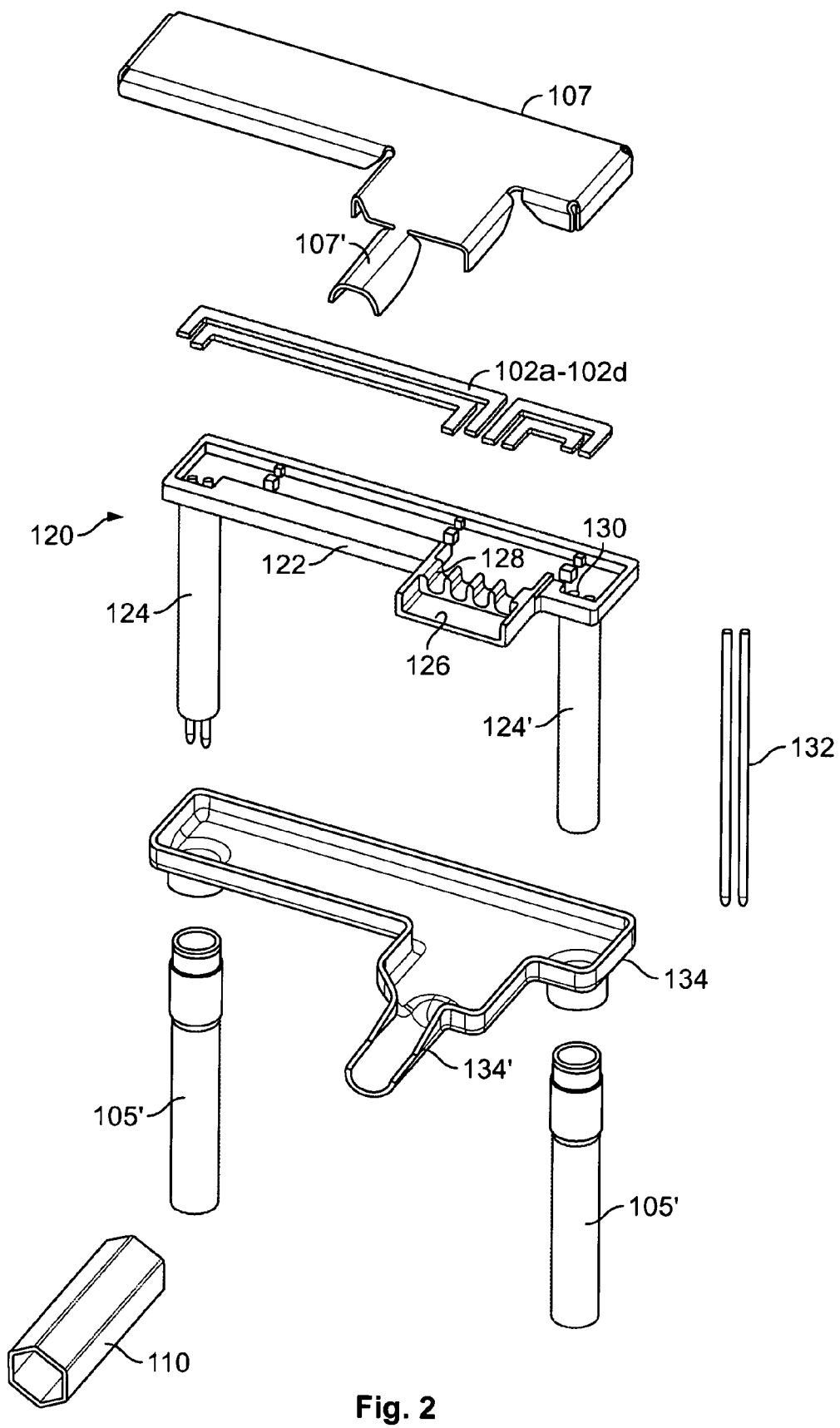
FIG. 2 shows an exploded view of the USB bridge of FIG. 1.

An exploded view of the USB bridge is shown in FIG. 2. The four contacts 102a to 102d are placed in a contact housing 120 which is made of one single dielectric part. It comprises a base 122 for placing the four contacts 102a to 102d and two cylindrical projections 124 and 124'.

The base 122 has on one edge a guiding part 126 for placing the end portion of the four cables 106a to 106d. Five protuberances 128 in the guiding part 126 further secure the four cables 106a to 106d in order to avoid a deterioration of the contact due to an excessive stress on the solder-joint.

Each of the two cylindrical projections 124 and 124' has two channels 130 open on the surface of the base 122 and adapted to receive two drawn wire contacts 132 (in the figure two drawn wire contacts are shown). The drawn wire contacts 132 are separated from each other by the portion of dielectric material between the two channels.

The two pairs of drawn wire contacts 132, placed in the two projections 124 and 124' and the two pairs of contacts 102a to 102d are shielded from the outside by a deep drawn part comprising one central body 134, the two hollow cylinders 105 and 105' and the cover 107 so as to form a completely closed shield against electromagnetic interferences.

The central body 134 is adapted to cover the base 122 completely and has a semi-cylindrical projection 134' adapted to secure the end portion of the USB cable 108, while the two cylinders 105 and 105' shield the two cylindrical projections 124 and 124' housing the drawn wire contacts 132. The four contact lines 102a to 102d are further shielded by the second shield 107, which cover the bottom side of the base 122 of the USB bridge and has a semi-cylindrical protuberance 107' which is complementary to the semi-cylindrical projection 134' and forms with the latter a housing for the end portion of the USB cable 108. Once the two shields 134 and 107 are joint together the shielding of the end portion of the USB cable 108 is guaranteed by the shield crimped with the ferrule 110 assembled over the two semi-cylindrical portions 134' and 107'.

Figure 3:
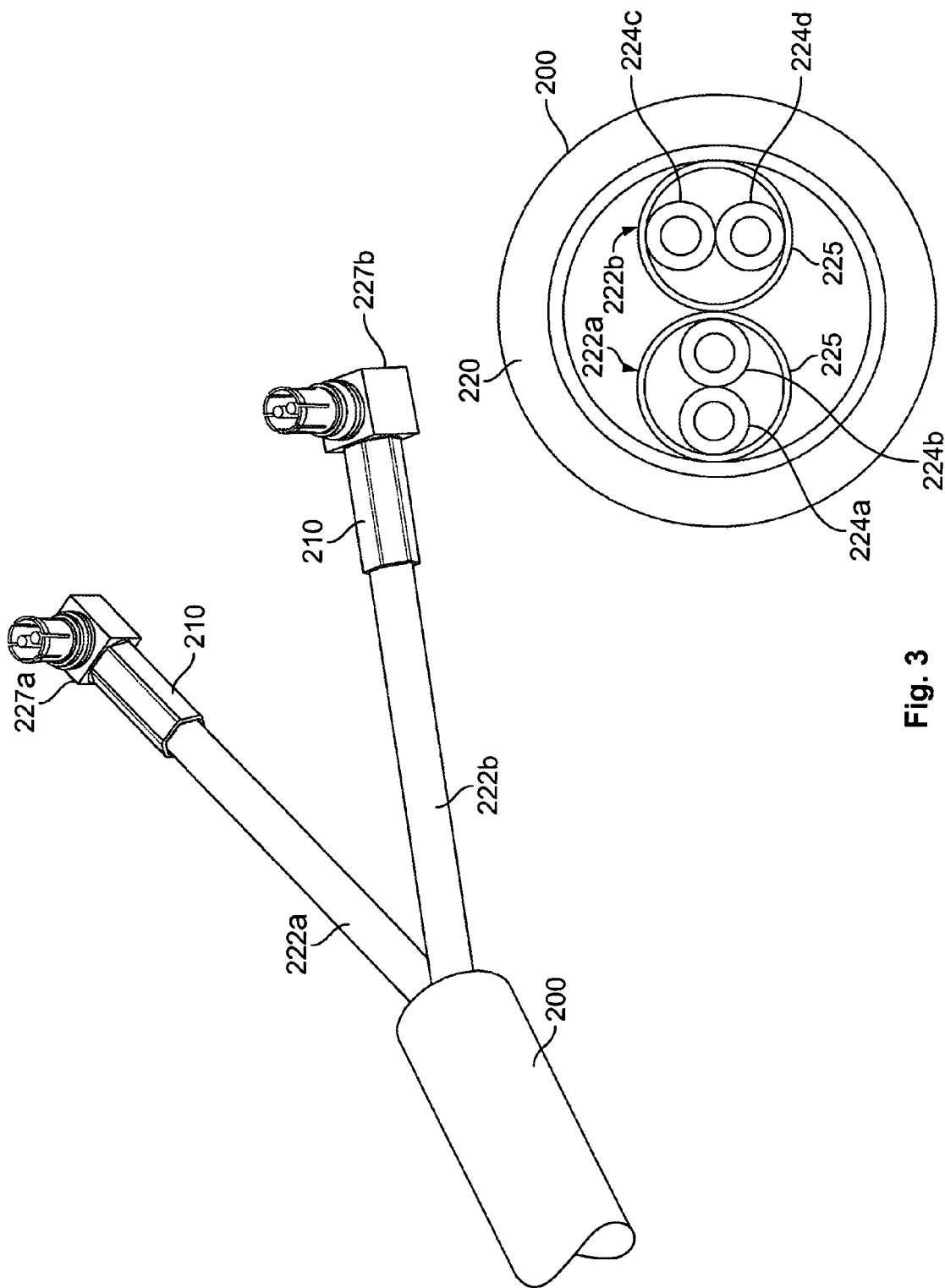
FIG. 3 shows the double shielded USB cable and a section thereof.

In FIG. 3, a section of a double shielded USB cable 200 for use in a car kit adaptor is shown. The USB cable comprises a first outer shield 220, which encompasses two twin axial cables 222a and 222b. The two twin axial cables 222a and 222b comprise the power line pair 224a and 224b and the signal line pair 224c to 224d of the double shielded USB cable 200. Unlike the power and signal lines of a standard USB cable, the USB lines 224a and 224b, and 224c and 224d in FIG. 3 are further shielded by an additional shielding 225.

This allows to strip the outer shield 220 so as to obtain two separated shielded conductor pairs 222a and 222b, which can be connected to two twin axial connectors 227a and 227b. Again, the shielding of the four cables 224a to 224d at the joint between the shielded conductor pairs 222a and 222b and the twin axial connectors 227a and 227b is ensured by a shield portion 210 crimped with a ferrule.

Figure 4:
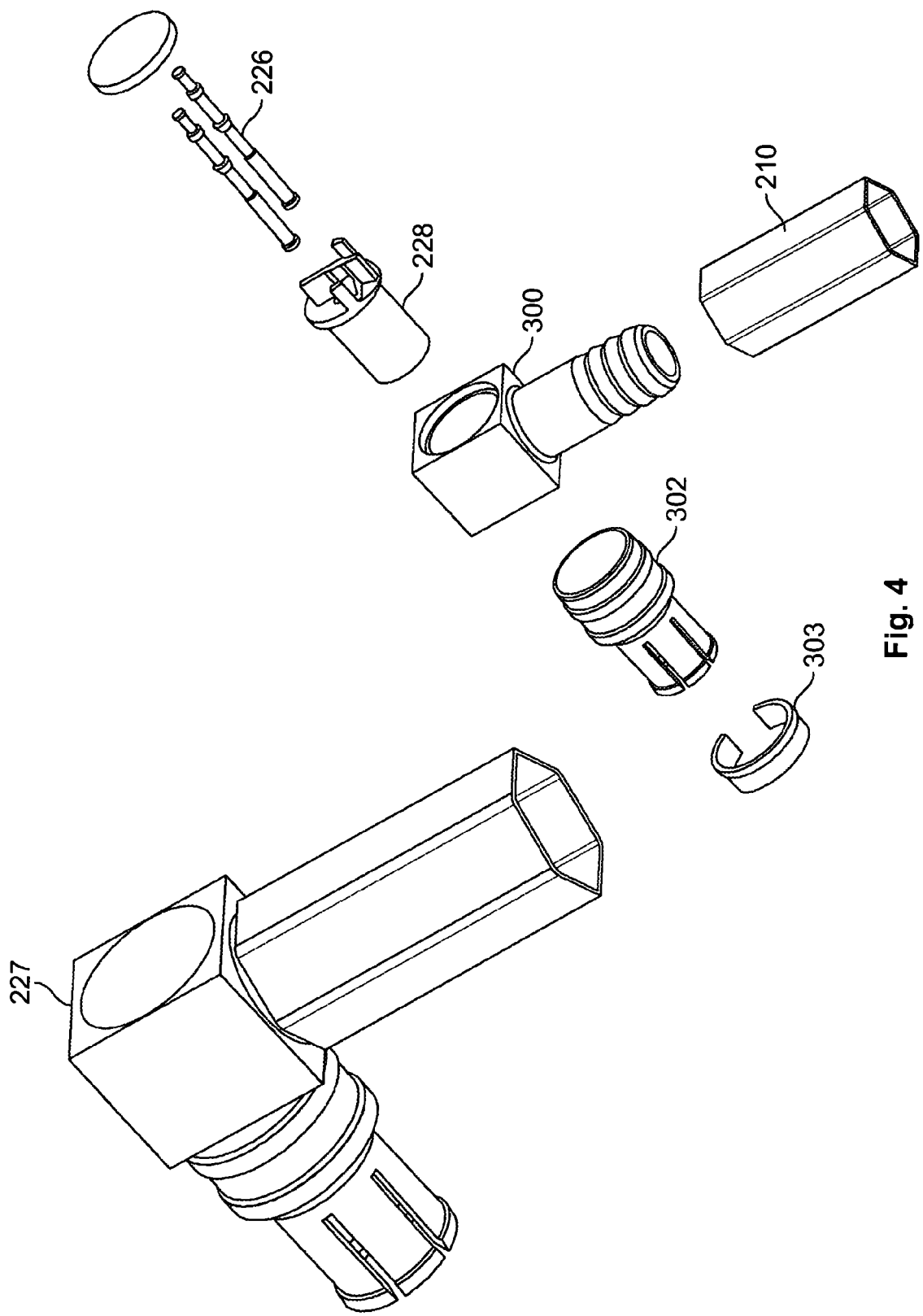
FIG. 4 shows a view of the twin axial connectors of the double shielded USB cable and an exploded view thereof.

FIG. 4 shows a detailed view of a twin axial connector 227. Two inner contacts 226 of the twin axial connector 227 are placed into a dielectric portion 228. Further, the assembly of the two inner contacts 226 and the dielectric portion 228 are inserted into a housing 300.

The portion of the inner contacts 226, which is arranged outside the housing 300 is protected by a cap 302 further fixed to an outer conductor 303. The two conductor lines of the twin axial cable 222 are inserted into the housing 300 in a direction perpendicular to the inner contacts 226 and are soldered to them. The twin axial connectors 227a and 227b have an L-shaped design which is a more versatile shape and may allow to easily place them into existing hardware portions.

Figure 5:
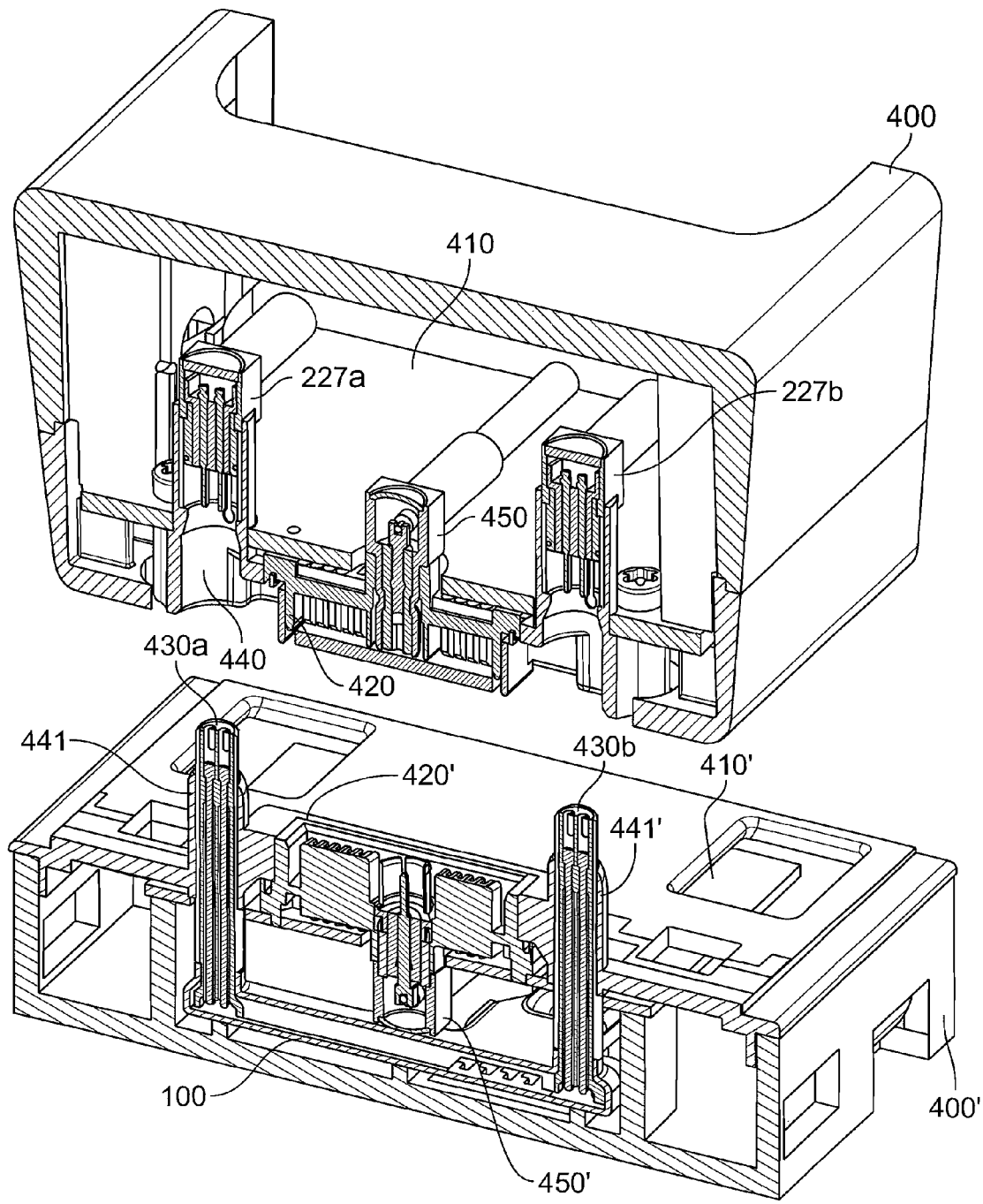
FIG. 5 shows a three-dimensional section of an overview of a system comprising an adaptor including two twin axial connectors and a base unit including a USB bridge and two connection lines.

An overview of a car kit using the USB connection described in FIGS. 1 to 4 is shown in FIG. 5. The car kit comprises an adaptor 400 and a base unit 400'. The adaptor 400 comprises a printed circuit board 410 for mounting the housing for the adaptor contacts 420, which includes a first coaxial contact 450. Similarly, the base unit 400' comprises a printed circuit board 410' for mounting the housing for the base unit contacts 420', which includes a second coaxial contact 450'. The housings 420 and 420' are further adapted to host complementary twin axial contacts 227a and 227b and 430a and 430b.

Due to the L-shaped design of the twin axial connectors 227a and 227b, the shielded power pair 224a and 224b and the shielded signal pair 224c and 224d of the USB cable 200 can be placed in the guiding slots 440 of a cradle adaptor 400. Further, since each twin axial cable 222a and 222b forming the signal and the power line of the double shielded USB cable 200 has the additional shielding 225, the connection line in the cradle adaptor 400 is fully shielded.

In the car kit base unit according to FIG. 5, two complementary twin axial connectors 430a and 430b and the power and signal lines 104 and 104' are placed in the cylindrical projections 441 placed at both sides of the plug housing 420' so as to facilitate the insertion of the base unit 400' in the adaptor 400.

The two twin axial connectors 430a and 430b in the base unit are connected by means of the USB bridge 100, to a pair of power lines and a pair of signal lines (not shown), which form a USB cable (not shown) connected to a shielded four position connector designed for USB connections in an automotive environment. The use of the USB bridge 100 allows to split up the USB line in the base unit in a signal pair and a power pair, which are placed into the guiding pins of the base unit.

Figure 6:
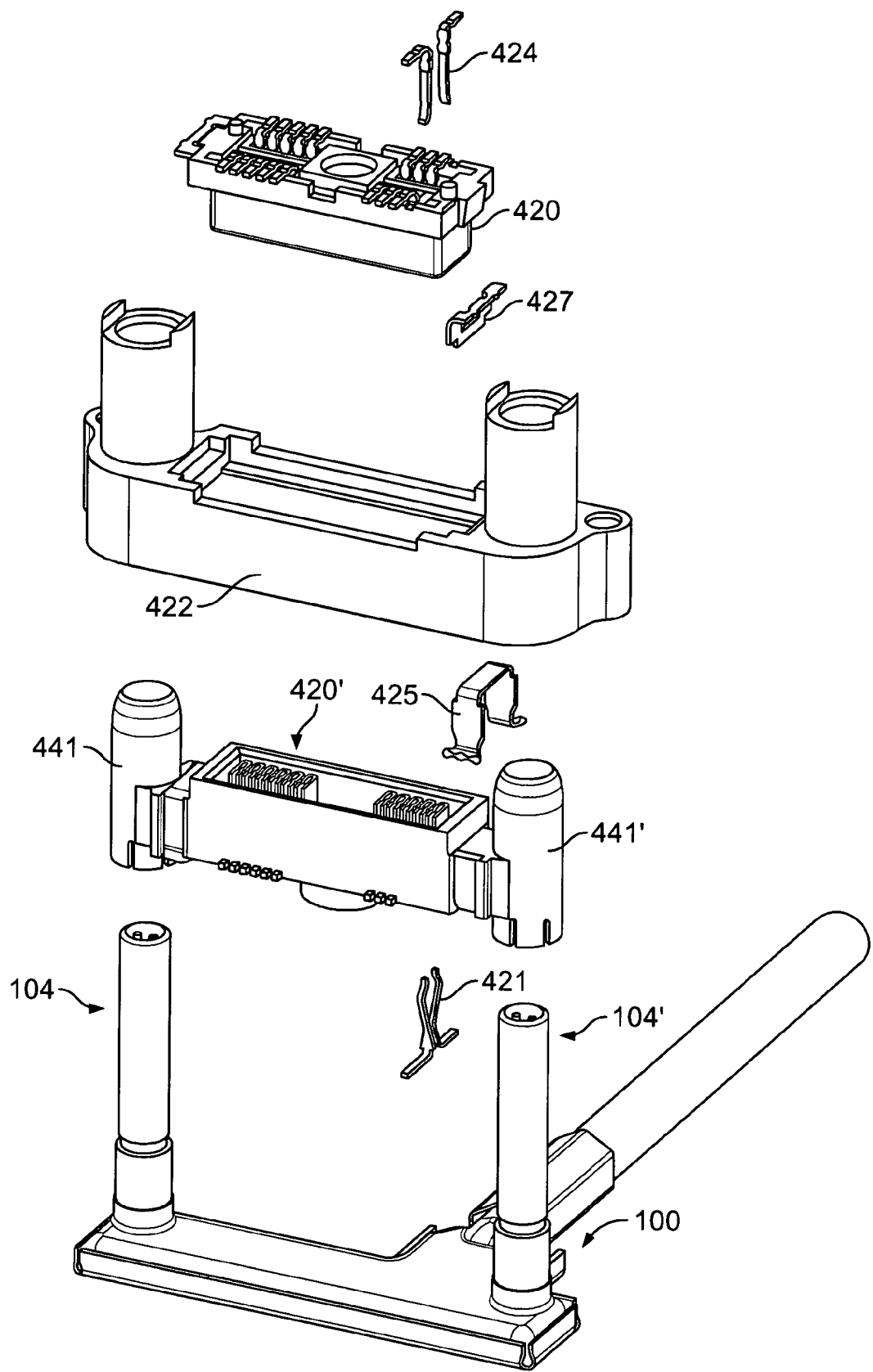
FIG. 6 shows an exploded view of the essential components of the adaptor and of the base unit.

In FIG. 6, an exploded view of the contact housings 420 and 420' for the adaptor and the base unit is shown.

The plug housing 420' comprises an eighteen-position plug contact adapted to receive eighteen plug contacts 421. Two cylindrical projections (guiding pins) 441 and 441' are further placed at both sides of the plug housing. The cylindrical protections 441 and 441' are hollow and have openings on the top and bottom sides so as to host the shielded signal pair 104 and the shielded power pair 104' of the USB bridge 100. The plug housing 420' is further fixed to the printed circuit board 410' through plug hold-downs 425.

FIG. 6 further shows the contact assembly for the adaptor 400. The adaptor 400 comprises a guiding member with two cylindrical slots 422 and an eighteen-position receptacle housing 420 adapted to receive eighteen receptacle contacts 424. The receptacle housing is fixed to the printed circuit board 410 through receptacle hold-downs 427. The guiding member 422 is fixed to the printed circuit board by screws (not shown).

Figure 7:
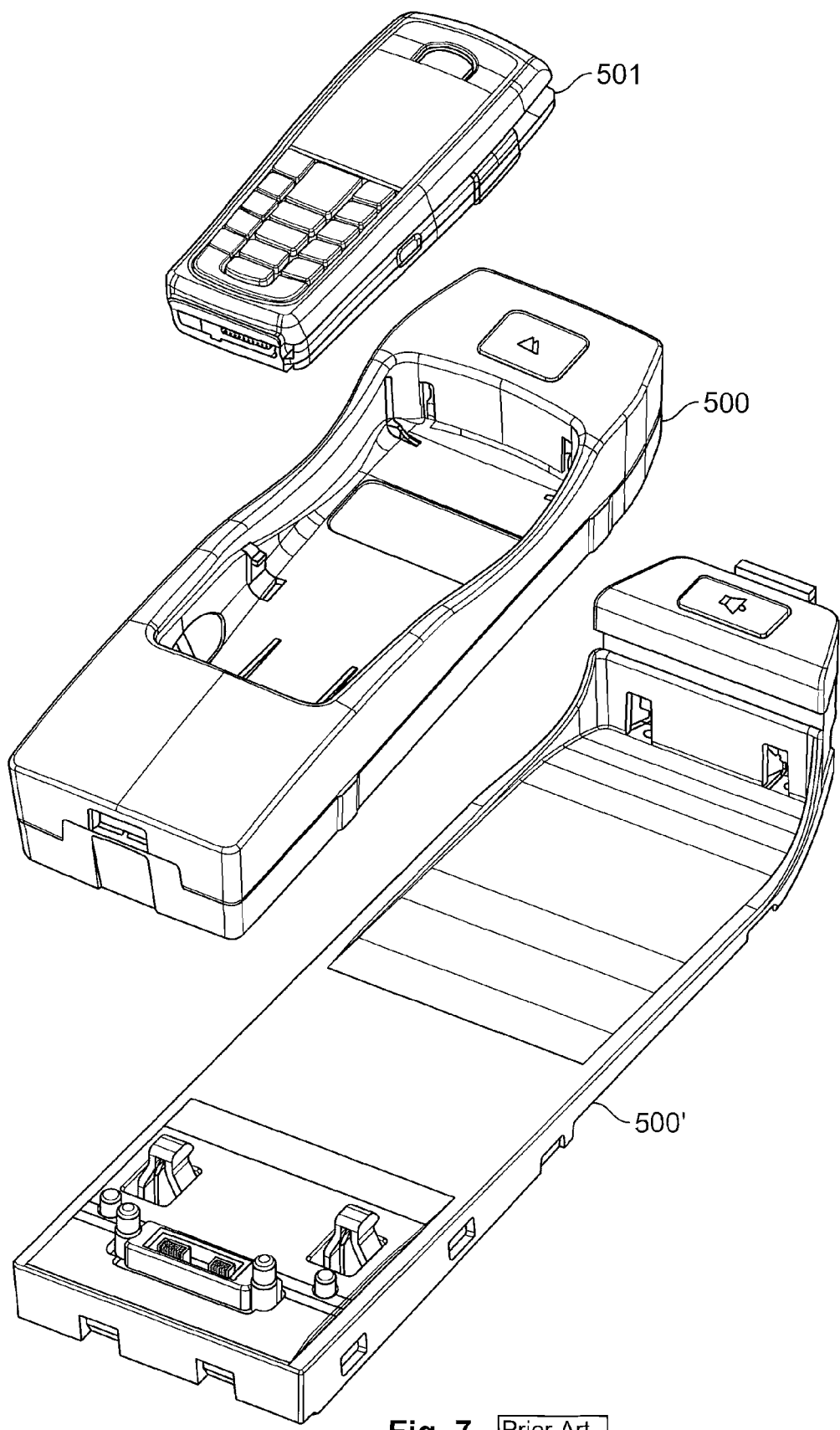
FIG. 7 shows a car kit according to the prior art.

An example of a standard car kit comprising an adaptor 500 for holding a mobile unit 501, and a base unit 500' for connecting the adaptor to the on-board system of a car is shown in FIG. 7.

Figure 8:
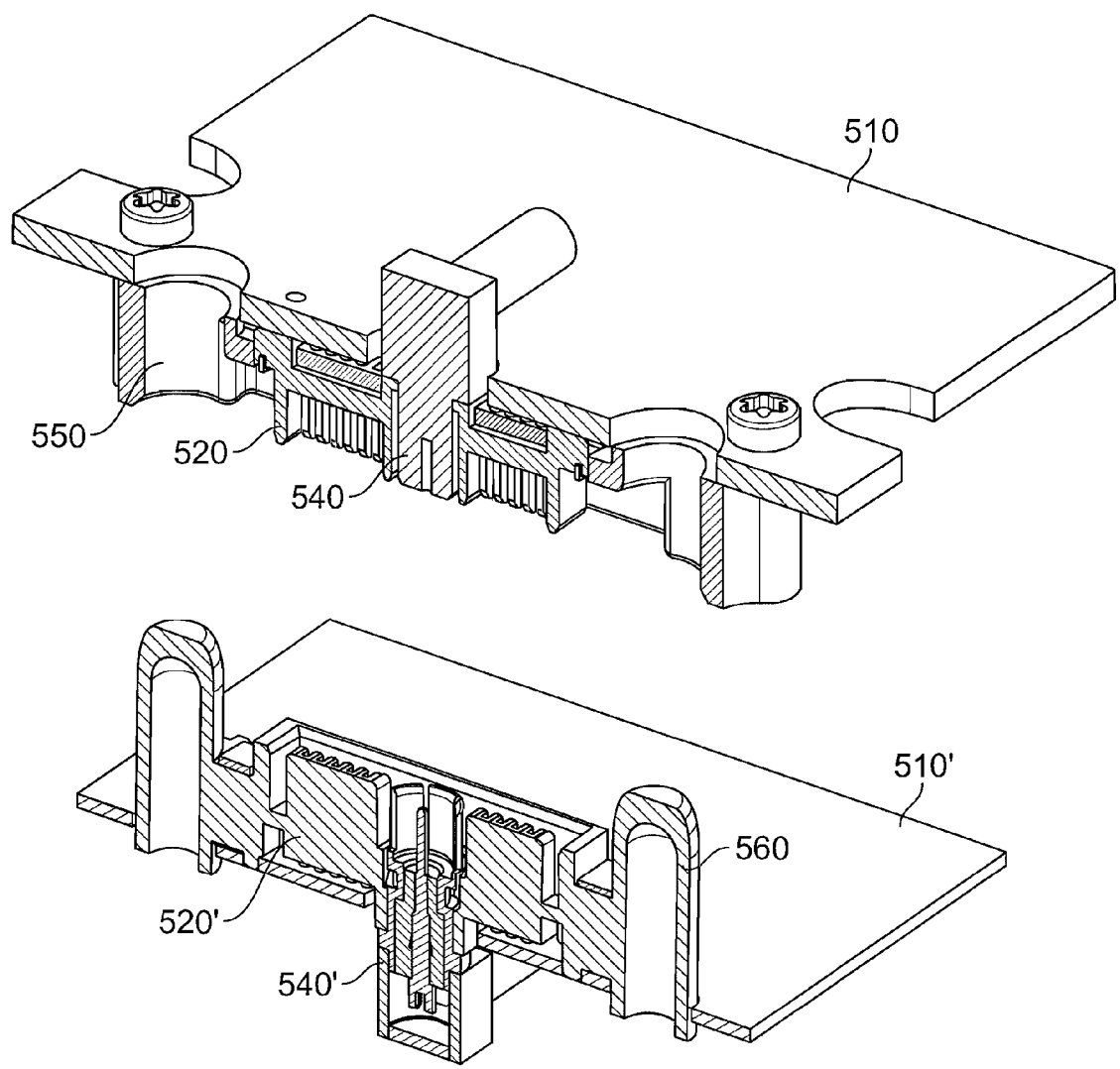
FIG. 8 shows a detail of the adaptor and the base unit of the car kit according to the prior art.

FIG. 8 shows a detail of the adaptor 500 and a base unit 500'. Here power is supplied and data is transmitted via an eighteen-position receptacle 520 and a coaxial connector 540 mounted on a printed circuit board (PCB) 510 in the snap-in adaptor. Further, two guiding slots 550 are placed at both sides of the receptacle 520.

The eighteen-position receptacle 520 and the coaxial connector 540 in the snap-in adaptor can be connected to an eighteen-position plug 520' and a coaxial plug 540' mounted on a printed circuit board 510' in the base unit 500'.

In a typical configuration, the plug 520' mounted on the printed circuit board 510' of the base unit 500' has two projections or guiding pins 560 adapted to be plugged into the complementary guiding slots 550 in the adapter 500, so as to facilitate the connection of the snap-in adaptor 500 to the base unit 500' and to correctly align the contacts in the receptacle 520 with the plug 520' in the base unit.

According to the present invention, a new USB connection is adapted to fit in a standard car kit. The two signal lines and the two power lines of a standard USB connection have been split into two different shielded lines in order to fit existing hardware envelopes so as to allow drop-in replacement with minimal changes to the existing cradle components. This solution is forwards and backwards intermateable with existing competition connectors and provides the car kit of the standard type with a fully shielded USB connection which complies with the USB 2.0 high speed specification regarding data speed and shielding.

Since the USB connector according to the present invention can be implemented, with minor changes, to existing hardware envelopes, a standard cradle connector can be updated with a USB connection, which is universal, fully shielded and comply with the USB 2.0 standards, in a cost-saving solution.

| Reference Numeral List | |
|---|---|
| Reference Numeral | Description |
| 100 | USB bridge |
| 102a to 102b | Bridge contacts |
| 104, 104' | Shielded power and signal lines |
| 106a to 106d | USB lines |
| 108 | USB cable |
| 110 | Shield crimped with ferrule |
| 120 | Contact housing |
| 122 | Base of the contact housing |
| 124, 124' | Contact housing cylindrical projections |
| 126 | Guiding part of the contact housing |
| 128 | Protuberances in the guiding part |
| 130 | Channels of the cylindrical projections |
| 132 | Drawn wire contact |
| 134 | Deep drawn part body |
| 134' | Semi-cylindrical portion of the deep drawn part body |
| 105, 105' | Deep drawn part cylinders |
| 107 | Second shield for the contact housing |
| 107' | Semi-cylindrical portion of the second shield |
| 200 | Double shielded USB cable |
| 210 | Ferrule |
| 220 | Outer shield |
| 222a, 222b | Twin axial cables |
| 224a to 224d | Power and signal pairs |
| 225 | Additional shielding |
| 227a, 227b | Twin axial connectors |
| 226 | Inner contacts of the twin axial connector |
| 228 | Dielectric portion |
| 300 | Contact housing |
| 302 | Protective cap |
| 303 | Outer conductor |
| 400, 400' | Car kit adaptor and base unit |
| 410, 410' | PCB for the adaptor and the base unit |
| 420, 420' | Housings for the adaptor and the base unit contacts |
| 450, 450' | Coaxial connector |
| 430a and 430b | Twin axial contacts for the base unit |
| 440 | Guiding slots of the adaptor |
| 441 | Cylindrical projections of the plug housing in the base unit |
| 421 | Plug contact |
| 425 | Plug hold downs |
| 422 | Guiding member |
| 424 | Receptacle contacts |
| 427 | Receptacle hold downs |
| 500, 500', 501 | Adaptor, base unit and mobile unit in a standard car kit |
| 510, 510' | PCB for the adaptor and the base unit of a standard car kit |
| 520 | Receptacle for the adaptor of a standard car kit |
| 520' | Plug for the base unit of a standard car kit |
| 540, 540' | Coaxial contacts |
| 550 | Guiding slots |
| 560 | Guiding pins |

The invention claimed is:

1. A Universal Serial Bus (USB) connector for use in a base unit in a car-kit with a USB connection, comprising:
two twin axial connectors including two inner contacts separated by a dielectric and further adapted to be connected to respective complementary connectors;
two pairs of shielded connection lines (104, 104'), each pair being connected to a twin axial connector;
a shielded USB bridge for connecting the two pairs of connection lines (104, 104') to four cable terminations to form a USB line.

2. The shielded USB connector according to claim 1, wherein the first pair of connection lines is a signal pair and the second pair of connection lines is a power pair.

3. The shielded USB connector according to claim 1, wherein each connection line is a drawn wire contact.

4. The shielded USB connector according to claim 1, wherein the shielded USB bridge comprises four contacts connected to the four cable terminations placed in a housing and further connected to the two pairs of shielded connection lines, respectively, the bridge housing being further covered by a closed shield.

5. The shielded USB connector according to claim 4, wherein the USB bridge housing comprises a one-piece housing integrally formed with the dielectric further adapted to receive the two pairs of connection lines.

6. The shielded USB connector according to claim 1, wherein the shielded USB bridge is covered by a deep drawn shield fabricated from metal.

7. The shielded USB connector according to claim 1, wherein an end portion of the USB line is connected to a shielded four position connector.

8. The shielded USB connector according to claim 7, wherein the shielded four position connector is designed for USB connections in an automotive environment.

9. A base unit for connecting an on-board electrical system to a mobile unit, comprising:
a plug housing including a plurality of contacts for electrically contacting complementary contacts of the mobile unit;
a coaxial connector;
a shielded USB connector, comprising:
two twin axial connectors including two inner contacts separated by a dielectric and further adapted to be connected to respective complementary connectors;
two pairs of shielded connection lines, each pair being connected to a twin axial connector; and
a shielded USB bridge for connecting the two pairs of connection lines to four cable terminations to form a USB line; and
a printed circuit board for mounting the plug housing and the coaxial connector and for connecting said contacts to the on-board electrical system.

10. The base unit according to claim 9, further comprising two projections having an opening on the top side, each projection being adapted to receive a pair of connection lines and to be plugged in an appropriate guiding slot in the mobile unit.

11. The base unit according to claim 10, wherein the projections have a cylindrical shape.

12. The base unit according to claim 10, wherein the two projections are integrated in the plug housing.

13. The base unit according to claim 9, wherein the plug housing is fixed to the printed circuit board by means of plug hold-downs.

14. The base unit according to claim 9, wherein the plug housing, the coaxial connector, the connection lines, the USB bridge, and the printed circuit board are embedded into a housing.

15. A USB cable for providing a shielded connection between a mobile unit and a car-kit adaptor, comprising:
- two twin axial connectors including two inner contacts separated by a dielectric and further adapted to be connected to the complementary connector in the base unit; and
- two twin axial cables, each twin axial cable including an impedance controlled differential pair connected to a twin axial connector, the two twin axial cables being partially enveloped in an outer shield to form a double shielded USB cable.

16. The USB cable according to claim 15, wherein the first twin axial cable is a signal pair and the second twin axial cable is a power pair.

17. The USB cable according to claim 15, wherein an end portion of the cable is connected to a mini USB plug.

18. An adapter for connecting a mobile unit to a car-kit base unit, comprising:
- a USB cable comprising:
    - two twin axial connectors including two inner contacts separated by a dielectric and further adapted to be connected to the complementary connector in the base unit; and
        - two twin axial cables, each twin axial cable including an impedance controlled differential pair connected to a twin axial connector, the two twin axial cables being partially enveloped in an outer shield to form a double shielded USB cable;
- a receptacle housing including receptacle contacts for electrically contacting complementary contacts of the base unit;
- a coaxial connector;
- a guiding member for guiding the plug base unit during insertion; and
- a printed circuit board for mounting the receptacle housing, the coaxial connector and the receptacle guiding member.

19. The adapter according to claim 18, wherein the receptacle guiding member has two projections, each projection being adapted to host a twin axial connector.

20. The adapter according to claim 19, wherein the projections have a cylindrical shape.

21. The adapter according to claim 18, wherein the twin axial connectors have an L-shaped design for facilitating the insertion in the projection of the receptacle slot.

22. The adapter according to one claim 18, wherein the receptacle housing, the coaxial connector, the receptacle guiding member, the double shielded USB cable, and the printed circuit board are embedded into a housing.

23. The adapter according to claim 18, wherein said adapter is integrated with the mobile unit.

24. A system, comprising:
- a base unit for connecting an on-board electrical system to a mobile unit, comprising:
    - a plug housing including a plurality of plug contacts and a plurality of plug projections;
    - a first coaxial connector;
    - a shielded USB connector, comprising:
        - a first pair of twin axial connectors including two inner contacts separated by a dielectric;
        - two pairs of shielded connection lines, each pair being connected to one of the first pair of twin axial connectors; and
        - a shielded USB bridge for connecting the two pairs of connection lines to four cable terminations to form a USB line;
    - a printed circuit board for mounting the plug housing and the first coaxial connector, and for connecting the plug contacts to the on-board electrical system;
- an adapter comprising:
    - a USB cable having:
        - a second pair of twin axial connectors including two inner contacts separated by a dielectric; and
        - two twin axial cables, each twin axial cable including an impedance controlled differential pair connected to one of the pair of second twin axial connectors, the two twin axial cables being partially enveloped in an outer shield to form a double shielded USB cable;
    - a receptacle housing including receptacle contacts for electrically contacting the plug contacts of the base unit;
    - a second coaxial connector;
    - a guiding member for guiding the base unit during insertion; and
    - a printed circuit board for mounting the receptacle housing, the second coaxial connector and the guiding member,
- wherein the plug housing projections in the base unit are adapted to be plugged into projections of the guiding member in the adapter and the connection lines included in the plug housing are adapted to be connected to the second pair of twin axial connectors.

* * * * *